(12) United States Patent
Page et al.

(10) Patent No.: US 7,734,036 B1
(45) Date of Patent: Jun. 8, 2010

(54) DYNAMIC ATTENUATION METHOD AND APPARATUS FOR OPTIMIZING VOICE QUALITY USING ECHO CANCELLERS

(75) Inventors: William Page, Hudson, MA (US); Daniel Deliberato, Natick, MA (US); Brian Buderman, Marlborough, MA (US); Radley F. Kneeland, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 10/941,751

(22) Filed: Sep. 14, 2004

(51) Int. Cl.
*H04M 9/08* (2006.01)

(52) U.S. Cl. .............................. 379/406.07; 379/406.16

(58) Field of Classification Search ............ 379/406.01, 379/406.07, 406.16
See application file for complete search history.

(56) References Cited

U.S. PATENT DOCUMENTS

| 4,460,808 A | * | 7/1984 | Battista et al. .............. 379/351 |
|---|---|---|---|
| 5,365,583 A | * | 11/1994 | Huang et al. ........... 379/406.07 |
| 2003/0212550 A1 | * | 11/2003 | Ubale ......................... 704/215 |
| 2004/0120271 A1 | * | 6/2004 | LaBlanc ...................... 370/286 |
| 2005/0129224 A1 | * | 6/2005 | Piket et al. ............. 379/406.01 |

OTHER PUBLICATIONS

ITU-T Recommendation G.168 (2000), Digital Network Echo Cancellers.

* cited by examiner

*Primary Examiner*—Alexander Jamal
(74) *Attorney, Agent, or Firm*—Hamilton, Brook, Smith & Reynolds, P.C.

(57) ABSTRACT

A method and corresponding apparatus for managing voice quality by optimizing the amount of attenuation placed in the echo return path based on the conditions observed during each telephone call. At the beginning of a telephone call, a pre-configured initial amount of attenuation is placed in the echo path of a communications connection that includes an echo canceller. After the call has begun, ERL is measured at a point in the communications connection that includes the attenuation. If the measured ERL is higher than necessary for the echo canceller to accurately perform double-talk detection, the attenuation in the echo path is slowly reduced from the initial amount. As the attenuation is reduced, the measured ERL reduces accordingly. When the measured ERL reduces to a minimum value required to perform double-talk detection, the reduction in attenuation is stopped.

11 Claims, 7 Drawing Sheets

| | | | | V290 | V292 | V291 | |
|---|---|---|---|---|---|---|---|
| Time | PSTN ERL | Measured ERL | PSTN input gain | PSTN output gain | DA Min ERL | DA final Sin Gain | DA Final Rout Gain | Notes |
| 0 | 10 | 30 | -10 | -10 | 15 | -4 | 0 | |
| 1 | 10 | 29 | -9.5 | -9.5 | 15 | -4 | 0 | |
| 2 | 10 | 28 | -9 | -9 | 15 | -4 | 0 | |
| 3 | 10 | 27 | -8.5 | -8.5 | 15 | -4 | 0 | |
| 4 | 10 | 26 | -8 | -8 | 15 | -4 | 0 | |
| 5 | 10 | 25 | -7.5 | -7.5 | 15 | -4 | 0 | |
| 6 | 10 | 24 | -7 | -7 | 15 | -4 | 0 | |
| 7 | 10 | 23 | -6.5 | -6.5 | 15 | -4 | 0 | |
| 8 | 10 | 22 | -6 | -6 | 15 | -4 | 0 | |
| 9 | 10 | 21 | -5.5 | -5.5 | 15 | -4 | 0 | |
| 10 | 10 | 20 | -5 | -5 | 15 | -4 | 0 | |
| 11 | 10 | 19 | -4.5 | -4.5 | 15 | -4 | 0 | |
| 12 | 10 | 18 | -4 | -4 | 15 | -4 | 0 | Input gain reaches V292 limit |
| 13 | 10 | 17 | -4 | -3 | 15 | -4 | 0 | |
| 14 | 10 | 16 | -4 | -2 | 15 | -4 | 0 | |
| 15 | 10 | 15 | -4 | -1 | 15 | -4 | 0 | Measured ERL reaches V290 limit |
| 16 | 10 | 15 | -4 | -1 | 15 | -4 | 0 | |
| 17 | 10 | 15 | -4 | -1 | 15 | -4 | 0 | |
| 18 | 10 | 15 | -4 | -1 | 15 | -4 | 0 | |

FIG. 6

DYNAMIC ATTENUATION METHOD AND APPARATUS FOR OPTIMIZING VOICE QUALITY USING ECHO CANCELLERS

BACKGROUND OF THE INVENTION

During some telephone conversations a talker can hear a delayed copy of the talker's own voice emanating from the telephone receiver. This phenomenon is known as talker echo. Talker echo is caused by signal reflections in the telephone network and acoustics. Echo becomes increasingly annoying to the talker as the echo increases either in volume or delay relative to the talker's speech.

When an electrical wave travels down a wire, the electrical energy can be reflected back if there is a change in impedance at any point in the transmission path. In the analog portion of a telephone network this impedance mismatch occurs most significantly at the hybrid that does a 4-wire to 2-wire conversion. If the impedances are well matched very little signal is reflected. However, when there is a large impedance mismatch, most of the signal can be reflected. This reflection at the hybrid is referred to as "Hybrid Echo".

Echo cancellers are used in the telephone network to remove (cancel) these reflections (echo) to as great a degree as possible. Much of this cancellation requires the echo canceller to compare an outgoing signal, which may contain a talker's speech signals and/or noise signals, to an incoming signal. The incoming signal may at times contain noise signals, an echo of the "outgoing" talker's speech signal and/or a speech signal from a second "incoming" talker.

For an echo canceller to function properly, it needs to be able to determine if the incoming signal contains speech from a local source (near-end speech) or the echo of an outgoing signal. This determination is often referred to as "double talk" detection. A common method for double-talk detection is to compare the outgoing signal to the incoming signal. The louder the volume of the echo with respect to the volume of the outgoing signal, the more difficult this determination becomes.

The ratio of the power of the echo to the power of the outgoing signal is referred to as the echo return loss (ERL). The ERL is equal to the amount of power that is lost from the transmitted signal when the signal is echoed back. ERL is said to be "lower" when the returning echo is close to the same volume of the outgoing signal. The ERL is "higher" when the echo returns at a more reduced volume. Without echo cancellation in the telephone network, telephone calls with low ERLs have more audible echo than calls with high ERLs.

In network configurations where the ERL is low (i.e., the echo is louder) for some calls, attenuation can be put into the echo path to make the ERL higher. A problem with such an approach is that for the attenuation to affect the echo, it also must affect the volume of at least one of the two voice paths. Further, the addition of such attenuation is then present even in calls where the ERL is already high. That is, the attenuation is usually static or fixed and does not change based on actual call conditions.

Automatic gain control (AGC) methods have also existed where the power level of a signal is monitored to ensure that a desired signal level is maintained. This approach generally cannot be used in a voice system as voice power levels are very inconsistent. In addition, AGC methods are concerned only with maintaining a power level, not with avoiding low ERLs.

SUMMARY OF THE INVENTION

The present approach provides a method and corresponding apparatus for managing voice quality by optimizing the amount of attenuation placed in the echo return path based on the conditions observed during each telephone call.

In an embodiment, at the beginning of a telephone call, a pre-configured initial amount of attenuation is placed in the echo path of a communications connection that includes an echo canceller. After the call has begun, ERL is measured at a point in the communications connection that includes the attenuation. If the measured ERL is higher than necessary for the echo canceller to accurately perform double-talk detection, the attenuation in the echo path is slowly reduced from the initial amount. As the attenuation is reduced, the measured ERL reduces accordingly. When the measured ERL reduces to a minimum value required to perform double-talk detection, the reduction in attenuation is stopped.

Accordingly, in one embodiment, apparatus for controlling attenuation to optimize voice quality in a communications network comprises an echo canceller at a first network node through which a call supported by the first network node and a second network node is established. The echo canceller may be coupled between a first network interface and a second network interface, and have a receive path for coupling a far-end signal from the first network interface to the second network interface and a transmit path for coupling a near-end signal from the second network interface to the first network interface. The echo canceller may further include an echo canceller circuit coupled to the receive path and the transmit path for filtering far-end echo from the near-end signal. At least one attenuator in the receive path or the transmit path or both is coupled between the echo canceller circuit and the second network interface. A processor in communication with the echo canceller sets the at least one attenuator to an initial attenuation value upon establishment of the call and reduces the attenuation value until either a measured echo return loss reaches a minimum dynamic attenuation ERL threshold or the attenuation value reaches a minimum attenuation value.

In one aspect, the processor may measure the echo return loss at the echo canceller circuit side of the at least one attenuator. In another aspect, the processor may measure echo return loss at a periodic time interval during a far-end talk state.

In another aspect, the processor may reduce the attenuation value at an incremental rate.

In certain embodiments, at least one of the network nodes may be a gateway. In other embodiments, the network nodes may include a digital switch in a TDM network.

In another embodiment, the at least one attenuator may comprise a first attenuator in the receive path and a second attenuator in the transmit path.

A method of controlling attenuation to optimize voice quality in a communications network includes establishing a call between a first network node and a second network node, the first network node having an echo canceller circuit coupled between a first network interface and a second network interface; upon establishment of the call, setting an initial attenuation value of at least one attenuator in a receive path or transmit path or both between the echo canceller circuit and the switched network interface; and reducing the attenuation value until either a measured echo return loss reaches a minimum dynamic attenuation ERL threshold or the attenuation value reaches a minimum attenuation value.

The present approach allows for echo cancellation to be effective even with calls that have low ERL, while minimizing the effect on calls that already have sufficiently low ERL.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 illustrates an example of dynamic attenuation in the embodiment of FIG. 3.

DETAILED DESCRIPTION OF THE INVENTION

A description of preferred embodiments of the invention follows.

Figure 1:
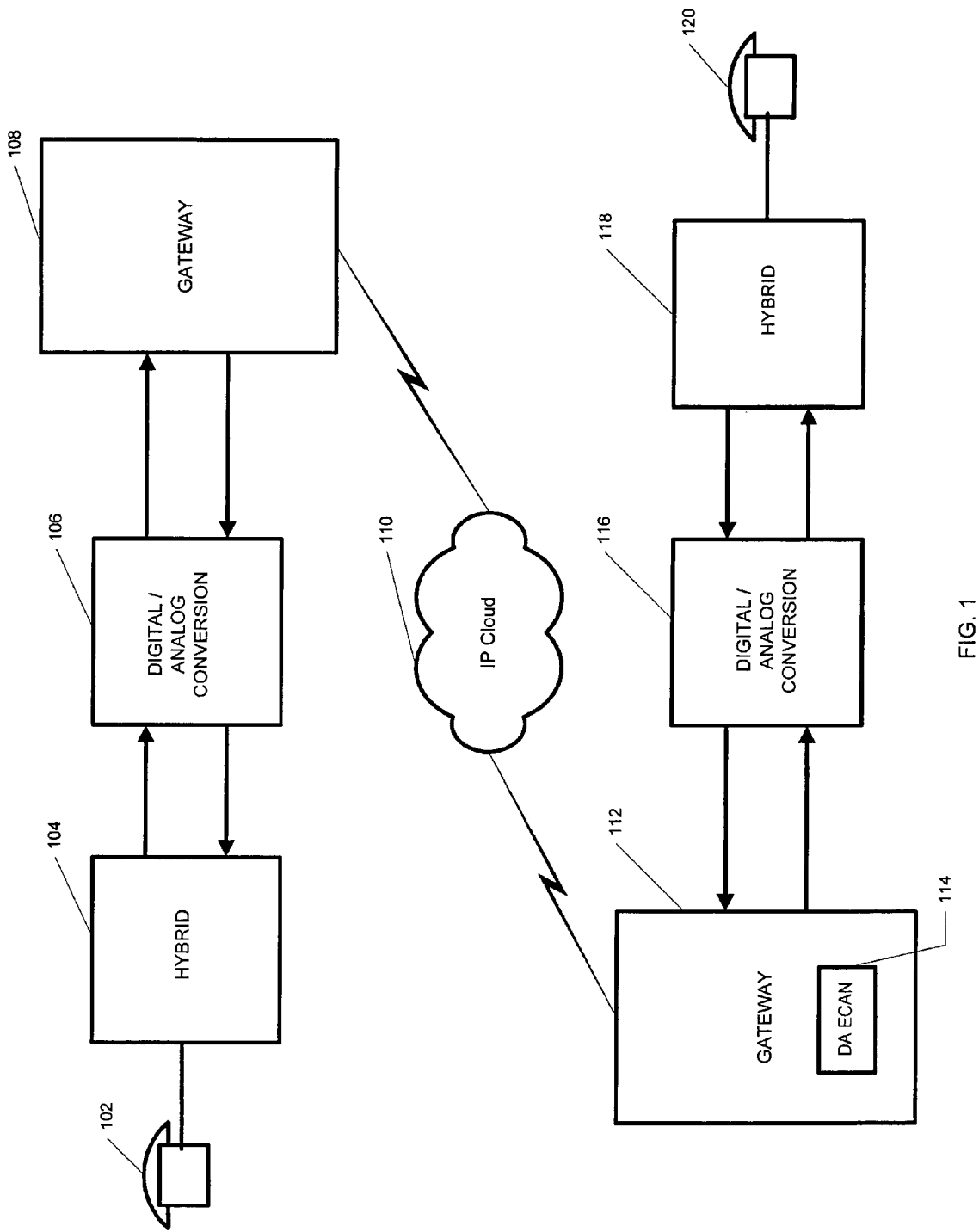
FIG. 1 is an end-to-end block diagram of a voice communications network in accordance with the present invention.

FIG. 1 is an end-to-end block diagram of a voice communications network that illustrates principles of the present invention. The network includes telephones 102, 120 connected to 4-wire to 2-wire hybrid circuits 104, 118, respectively. The hybrid circuits 104, 118 are connected to respective digital/analog conversion circuitry 106, 116. The hybrid circuits 104, 118 and the digital/analog conversion circuitry 106, 116 are elements commonly present in a public switched telephone network (PSTN), such as part of a voice circuit switch. These PSTN elements are in communication with network nodes referred to as gateways 108, 112. The gateways 108, 112 are connected to an Internet Protocol (IP) network 110 and are configured for Voice over IP (VoIP) capability. Gateway 112 includes an echo canceller 114 adapted to operate with dynamic attenuation in accordance with the principles of the present invention as described further herein. The other gateway 108 may also include an echo canceller, but is not necessary to describe the principles of the present invention.

With reference to the gateway 112 of FIG. 1, "near-end" refers to the PSTN side of the gateway 112. The near-end signal is received from the PSTN and includes near-end voice, far-end echo and noise components. "Far-end" refers to the IP network side of the gateway 112. The far-end signal is received from the IP network.

The path of talker echo is now described at a high level. When a talker at telephone 102 is talking, the telephone converts the sound signal to an electrical signal. The voice signal is then digitized at digital/analog conversion circuit 106. A digital sampling method is described in ITU standard G.711, and is designed to produce a fairly constant ratio of signal level to quantization noise. When the digital signal reaches the gateway 108, in most cases it is desirable for there to be no gains (or losses) from the input of a source gateway (e.g., 108) to the output of the destination gateway (e.g., 112). The digital signal is converted to analog at the digital/analog conversion circuit 116. When signal energy enters the hybrid circuit 118, some of the energy is likely reflected back. In most calls this is the primary source of echo. The Echo Return Loss (ERL) can be measured here as the difference of the power as it entered the hybrid 118 and the power of the signal reflected back. For example, if 5% of the energy is reflected back this means that the echo power will be 13 dB lower than the power of the voice signal at this point.

As echo travels back to the gateway 112 from the hybrid 118, any signal level changes in the PSTN network portion that would affect near-end talk will also affect the echo. The ERL at the gateway 112 can be very different than the ERL at the hybrid, as these signal level changes have affected the signal. The ERL at the gateway is equal to the difference of the power of the voice signal it transmits and the power of the echo that returns. In this return path at the gateway 112 is the point at which echo cancellation is applied.

It should be understood that, while the embodiments described herein include VoIP gateways, other embodiments in accordance with the principles of the invention may have digital circuit switches or other switches well-known in a TDM network, without having VoIP nodes present. That is, the principles of the present invention are applicable for use with digital echo cancellers in both VoIP and TDM applications.

Figure 2:
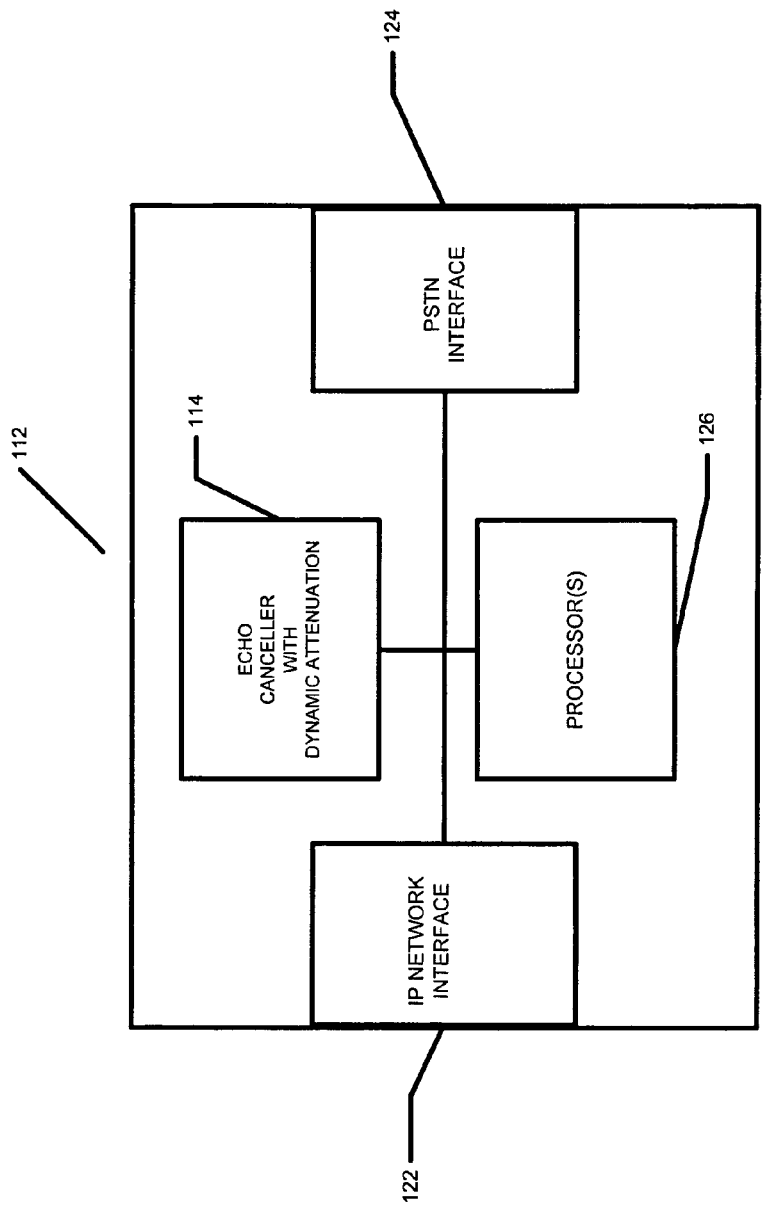
FIG. 2 is a block diagram of an embodiment of a gateway of FIG. 1.

FIG. 2 is a block diagram of the local gateway 112. The local gateway 112 includes an IP network interface 122, processor(s) 126, echo canceller 114, and PSTN interface 124. The IP network interface 122 is in communication with the IP network 110 of FIG. 1. The PSTN interface 124 is in communication with the PSTN network including elements digital/analog conversion circuitry 116 and hybrid 118. In other embodiments, the IP network interface may be a TDM network interface.

In operation, the processor(s) 126 in the embodiment of FIG. 2 may control the echo canceller 114 in a manner as described further herein to provide for dynamic attenuation on a call by call basis. The processor(s) 126 may also execute other processes related to or distinct from the methods described herein.

In alternative embodiments, the processor(s) 126 may be integrated into the echo canceller 114 or other circuitry in the gateway 112. The processor(s) 126 may also be located in another network node external from the gateway 112 and support the techniques described herein.

It should be understood that the processor(s) 126 may be a general purpose processor, digital signal processor, custom designed processor, or other form of processor implemented in hardware, firmware or executing software. When executing software, the processor loads processor instructions from a computer readable medium and executes the program instructions in a typical manner. The computer readable medium may be Random Access Memory (RAM), Read Only Memory (ROM), optical or magnetic disk, removable memory, or other type of computer readable media. It should also be understood that the program instructions may be located external from the processor(s) 126, in which case they are downloaded or uploaded via a communications network using various communications network techniques.

Figure 3:
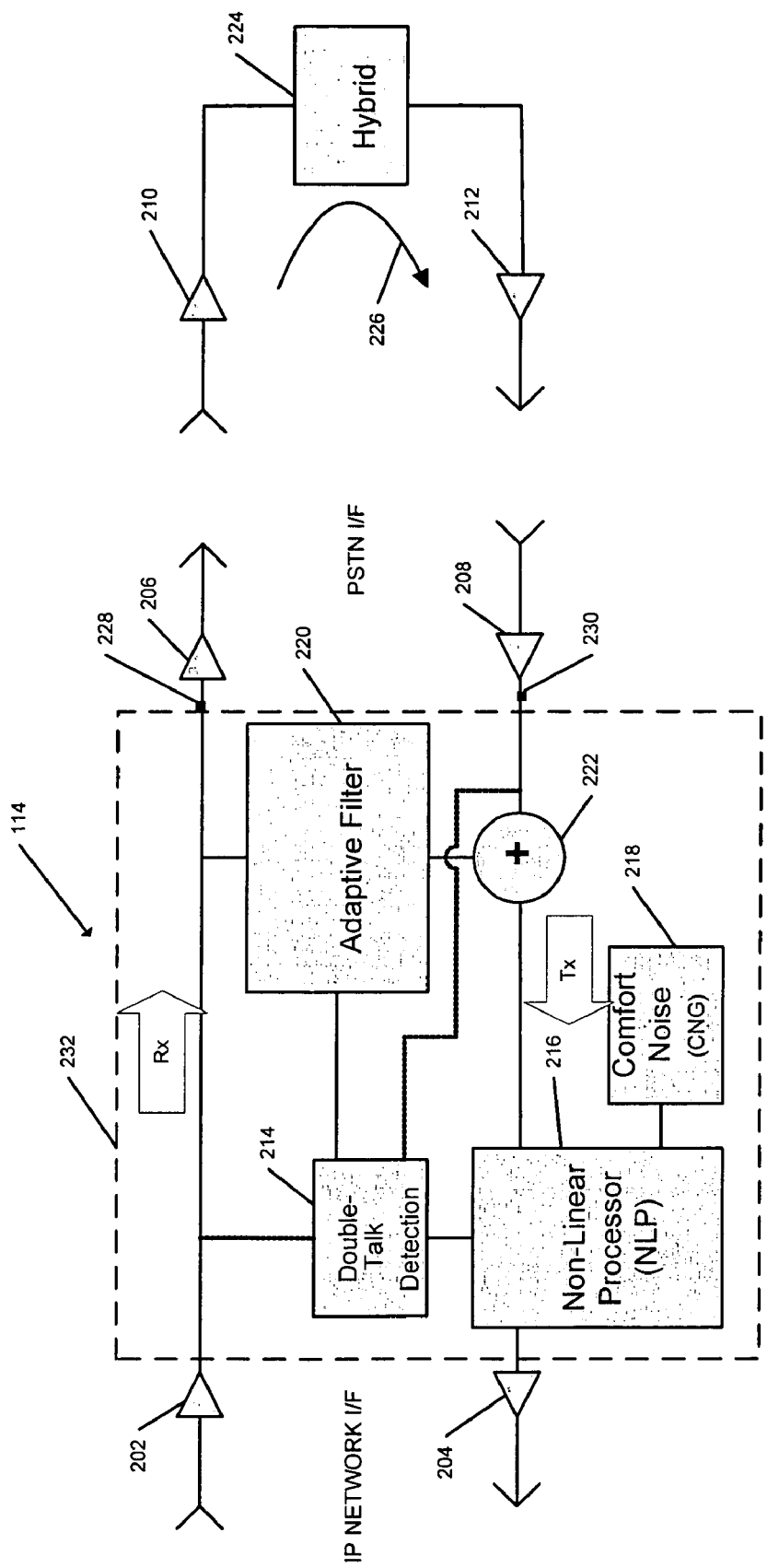
FIG. 3 is a block diagram of an embodiment of an echo canceller of FIG. 2.

FIG. 3 is a block diagram that illustrates the echo canceller 114 in more detail. The echo canceller includes an echo canceller circuit 232 that comprises an adaptive filter 220, double-talk detection 214, non-linear processor (NLP) 216 and comfort noise generator (CNG) 218. The echo canceller is coupled between packet network interface 122 and switched network interface 124. A receive path (Rx) couples a far-end signal from the packet network interface to the switched network interface. A transmit path (Tx) couples a near-end signal from the switched network interface to the packet network interface. The echo canceller circuit 232 is coupled to the receive path and the transmit path for filtering far-end echo from the near-end signal.

In the receive path, a first attenuator 206 is coupled between the echo canceller circuit 232 and the switched network interface 124. In the transmit path, a second attenuator 208 is coupled between the switched network interface 124 and the echo canceller circuit 232. The echo canceller 114 may also include additional attenuation 202, 204 in the respective receive and transmit paths at the IP network interface side of the circuit.

In FIG. 3, a hybrid circuit 224 is shown coupled to the PSTN interface 124 with intermediate elements of the PSTN not shown for simplicity. At the hybrid 224 there also may be attenuation 210, 212 as part of the PSTN circuitry.

The typical functions of the echo canceller are now described at a high level. The adaptive filter 220 is configured to statistically model the nature of the echo so that it may predict the amount of echo returned from the hybrid 224. Then the predicted echo can be subtracted from the incoming signal at summing block 222. If the echo is accurately predicted it is hence removed. However, there are limits on how accurate that prediction can be made and therefore, a residual echo is generally always present. The adaptive filter functions better if it changes characteristics based on the presence of near-end speech.

The non-linear processor (NLP) 216 provides a way to remove this residual echo. Simply, the nonlinear processor attenuates any signal that is output from the adaptive filter 220. This signal may contain residual echo, near-end talk, and near-end noise. When the NLP attenuates, all of these signal components are affected. Since attenuating the near-end talk is highly undesirable, the NLP should be engaged (add attenuation) or disengaged (pass the signal) at the proper time.

The double-talk detector 214 determines when the NLP is to be engaged. The human brain is very good at picking out voice signals from noise or separating different voice streams. Making this decision using DSP processing in a manner such that the human brain will not pick up the errors is very complex and difficult to do.

The comfort noise generation (CNG) 218 replaces some of the near-end noise that is attenuated by the NLP. When no CNG is added listeners often hear uncomfortable silences as if the phone has gone dead, when the NLP engages. The goal of the CNG is to replicate the noise on the incoming signal so listeners are not annoyed when the "true noise" is removed with the residual echo.

As noted above, one problem with an NLP is that the attenuation it applies cannot target the echo alone. That is, all of the components that make up the near-end signal; speech, echo, and noise, will be affected. For these reasons the attenuation is only added during certain times in the call.

Figure 4:
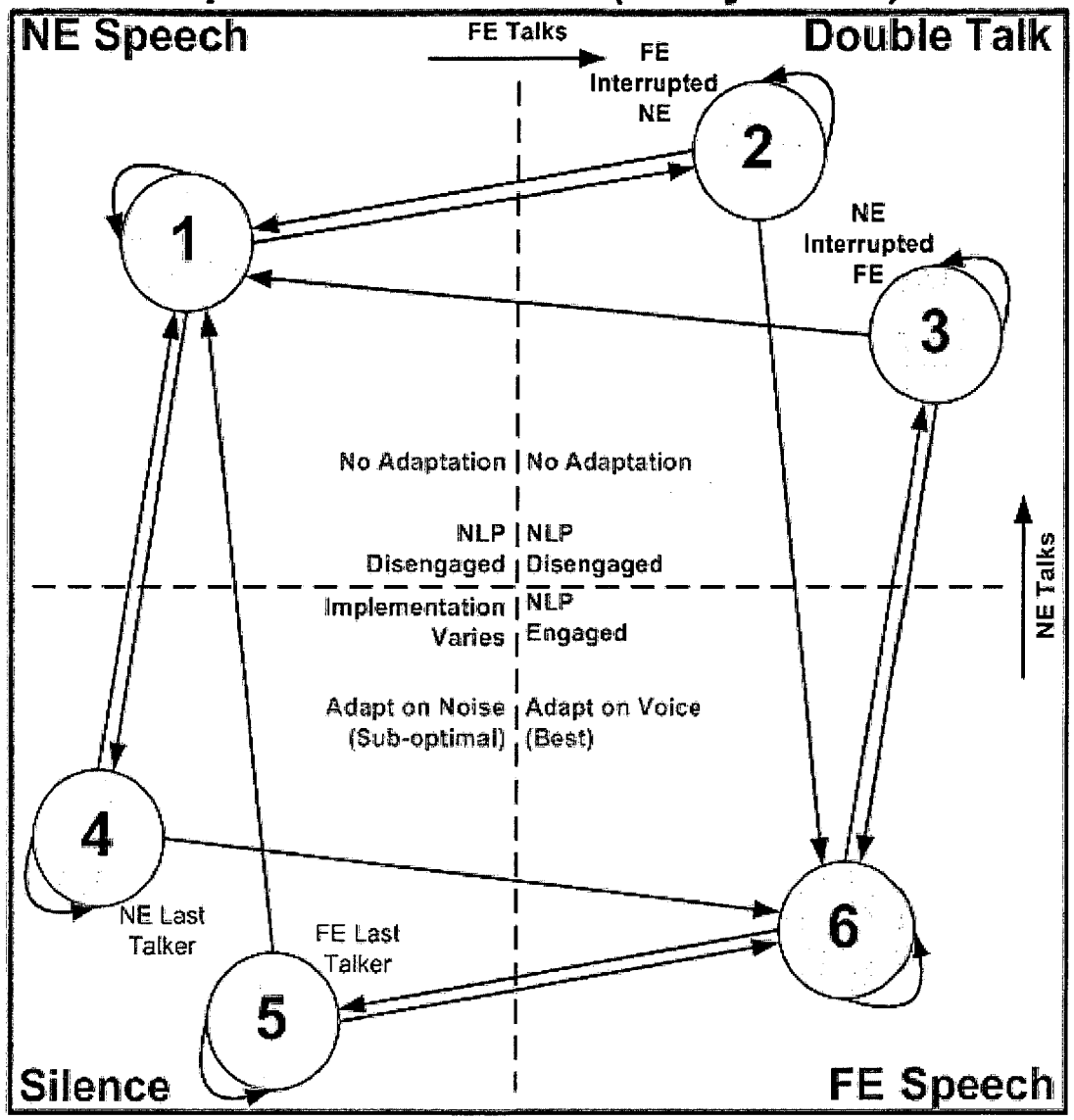
FIG. 4 illustrates a Brady Model of speaker state transitions.

During a telephone conversation there are transitions between periods of silence and periods of speech. FIG. 4 is a state diagram, often referred to as the "Brady Model", that shows the conditions of speech and silence that may occur in a conversation (see P. T. Brady, "A model for generating on-off speech patterns in two-way conversation," Bell Syst. Tech. J., September 1969, pp. 2445-2472.).

In the states on the top half of the state diagram the near-end talker is speaking, in the bottom half they are silent. In the states on the right hand side of the diagram the far-end talker is speaking, and on the left they are silent.

The adaptive filter 220 (FIG. 3) can only adapt when there is a far-end talker, and adapts best when there is no near-end talker. So the best adaptation occurs in state #6. Adaptation can occur in states #4 and #5 as there is always noise present, but adaptation slows when the far-end signal is small. In state #1 again the far-end signal is small so adaptation slows and it is best not to adapt as the near-end signal is mostly speaker. However, it is during the double-talk states, #2 and #3, that adaptation is the worst, as there are both a strong far-end signal and a near-end signal present that are mostly speaker. Hence the name double talk detection. However, as it can be seen it is best to detect all states rather than just the state of double-talk.

The NLP needs to be engaged during periods of far end talk to remove the echo, but it cannot engage during periods of near-end talk or the near-end talker's speech will be removed. When the NLP does not engage at the proper time, the residual echo will "leak" back to the far-end. When the NLP does not disengage at the right time, the far-end will hear the near-end talkers speech be "clipped" or "squelched". During periods of silence the state of the NLP does not really matter, however if we could predict whether the next state would be #6 or #1 we could "pre-set" the state of the NLP. This "pre-set" is one way the Brady model states #4 and #5 can be handled differently.

As shown in the Brady Model state diagram, there are two states that exist in the "silence" and "double-talk" states. These states are split because in typical conversations there are often short transitions into these states. During the early period of any transition into one of these states there is large probability that the state will re-transition back into the state it just came from. For example, when the far-end talker is speaking (in state #6) and they go silent (we enter state #5) there is a much higher probability that the far-end talker will speak again (back to state #6) than there is that the near-end talker will speak (we enter state #1). The longer we are in state #5 the more even the probabilities of entering state #6 or #1 become. Since the NLP is engaged in state #6 it would make sense to keep the NLP engaged during the early period of state #5 since we expect to go right back to state #6.

A frequently used method of determining the state transitions is by doing power level comparisons. The first delineation in power level that must be made is the difference between noise and a talk signal. This is not very difficult as there is usually a large power difference between typical noise levels (~−40 dBm0) and typical talker levels (>−25 dBm0). This allows us to detect the silence (both signals are around −40 dBm) and the near-end talk only (far-end signal at −40 dBm0 and near-end signal >−25 dBm0) quadrants with little difficulty. However, when there is a far-end talker we will also have an echo, and it is very possible that that echo looks more like a near-end signal than noise. So, we need an added method to determine between the far-end talk only and the double-talk quadrant.

Figure 5:
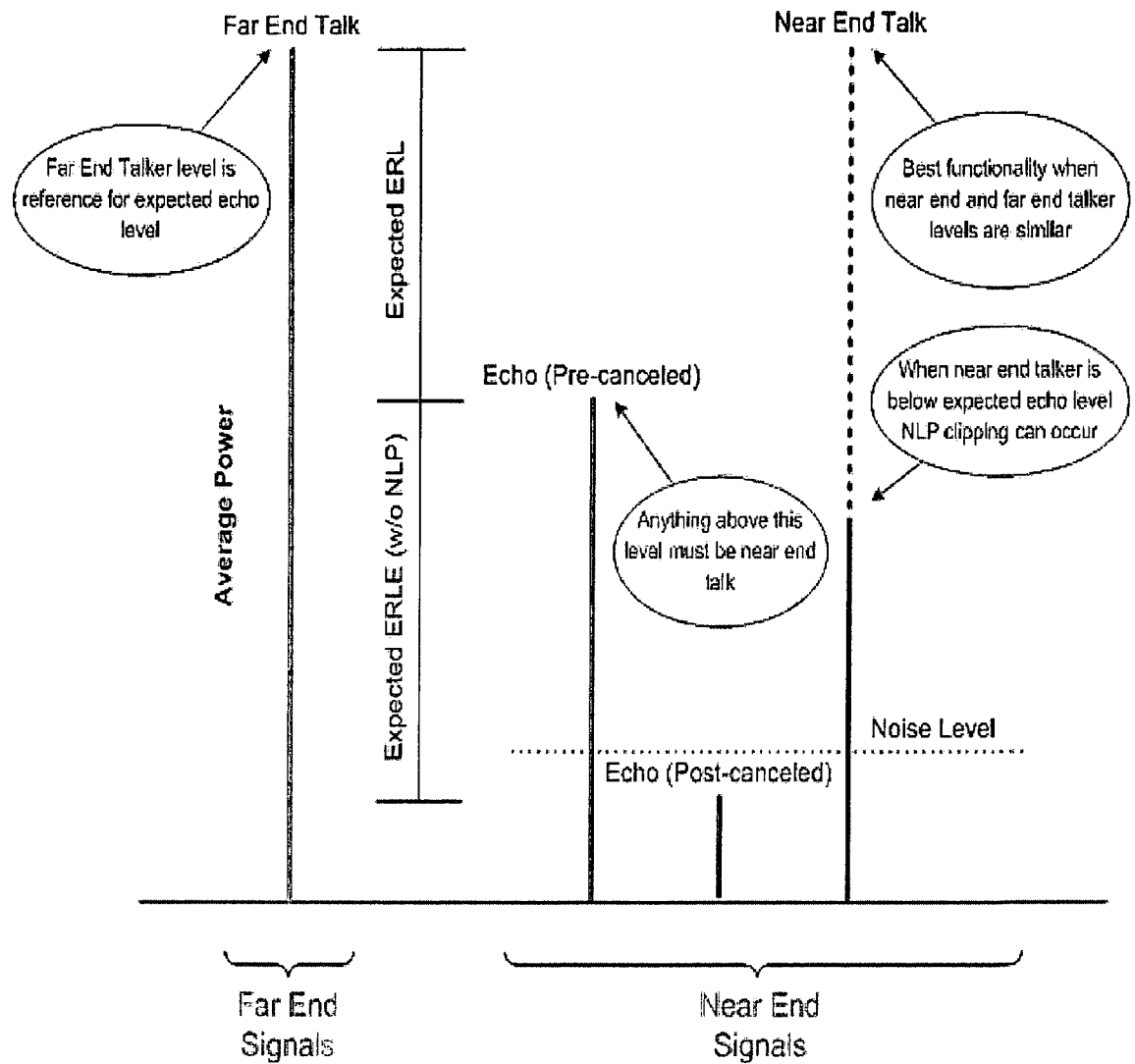
FIG. 5 illustrates power level comparison for far-end and near-end signals.

The method that is used requires that the echo canceller know what the lowest (or minimum) expected ERL it will see. Then it knows that any near-end signal that has more power than the far-end talk signal minus the minimum ERL must be near-end talk. FIG. 5 illustrates this concept.

As shown in FIG. 5, the power in the far-end signal transmitted onto the PSTN is used as a reference level. During periods of far-end talk only (Brady model state #6) the highest Echo we could see is lower than the far-end signal level by at least the minimum expected ERL level (so-called minERL setting). If any echo does occur that is higher than this level the echo canceller will misclassify the echo as a near-end talker and think that it is in the double-talk quadrant. When this misclassification happens the adaptive filter adaptation does not occur when it should and the NLP will not engage to cancel the echo.

When a near-end talker and far-end talker speak simultaneously (a period of double-talk), it is necessary that the power in the in the near-end signal will be higher than the highest expected echo level. If at any time near-end speech is not higher than this level, the quadrant will be misdetected and the echo canceller will act as though it is in the far-end speech only quadrant. When this misdetection happens the NLP will engage and attenuate the near-end signal. Also, the adaptive filter will attempt to adapt on the near-end signal and may diverge.

Having described the functionality of echo cancellers and the considerations for why proper double-talk detection is important, the dynamic attenuation approach of the present invention is now described.

As noted above, with fixed attenuations placed at the PSTN side of a gateway to ensure sufficient ERLs, sometimes a portion of the calls will experience low volume. These low volume calls are usually not the same calls that have the low ERLs, as low ERLs do not occur on lines that already have attenuation in the PSTN path. The dynamic attenuation (DA) according to the present invention helps to mitigate low volume calls by removing the attenuations on a call by call basis when the ERL is sufficient.

Referring to FIG. 3 again, ERL is measured based on power levels at points 228, 230 on the echo canceller side of attenuation 206, 208. This means that the "effective" ERL as seen by the echo canceller 114 and processor(s) 126 (FIG. 2) is the ERL at the PSTN side of the gateway plus the two attenuation values 206, 208.

In an embodiment, the ERL may be measured during every second of far-end talk. This measured ERL is compared to a minimum ERL threshold for attenuation removal, called the DA minimum ERL. If the measured ERL is greater than the DA minimum ERL, the DA function is triggered.

Note that the MinERL setting mentioned above is different than the dynamic attenuation minimum ERL. It is suggested that the DA min ERL be set at least 3 dB above the MinERL setting to ensure a margin of ERL more than may be needed.

Once triggered, the DA function checks the attenuations 206, 208 to two corresponding values, DA final Rout gain and DA final Sin Gain, respectively. If the attenuations have not reached their final values, they will each be lowered (at about one dB total gain per second) until the DA min ERL is reached, or both gains are at their final values.

An example is given in the tabular diagram of FIG. 6.

As illustrated, as time progresses the measured ERL decreases by one dB until either both gain limits are met or the DA minimum ERL is reached. The attenuations (negative gains) are removed as much as possible, leading to fewer low volume complaints. The attenuations of 10 and 10 used in the example are for illustration only.

Figure 7:
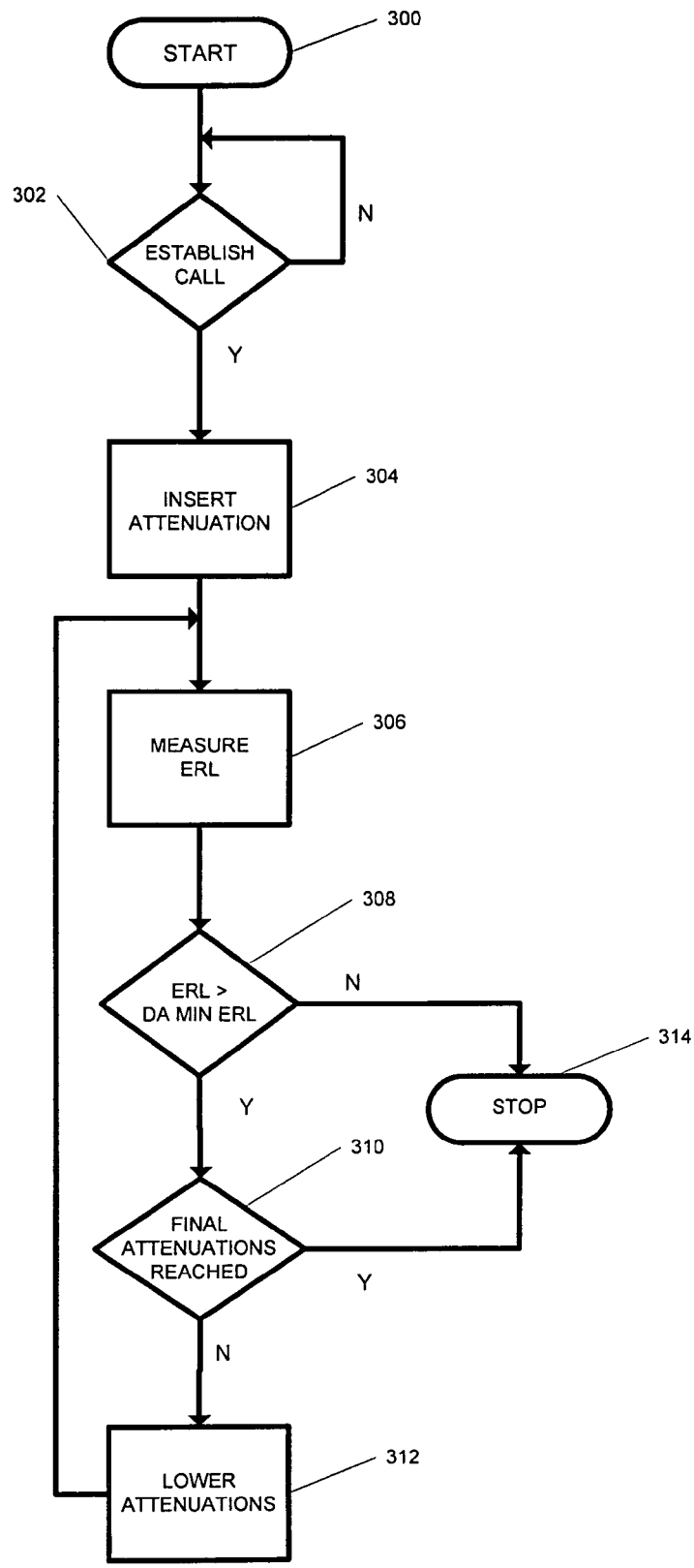
FIG. 7 is a flow diagram that illustrates a process executed in the gateway of FIG. 2 in accordance with principles of the present invention.

FIG. 7 is a flow diagram of a process that may be executed by the processor(s) 126 in the gateway 112 of FIGS. 1 and 2. Reference is also made to elements in FIG. 3. The process starts (step 300) and determines whether a call is being established (step 302). If a request has not been received, the process continues to wait until a request is received. If a request to establish a call is received, the process continues and executes a subprocess (steps 304 through 314) according to the principles of the present invention, that appropriately and dynamically controls attenuation at the echo canceller in a communications path on a call by call basis.

In particular, at step 304, upon establishment of the call, initial attenuation values of the attenuators 206, 208 in the respective receive and transmit paths are set. At step 306, the ERL is measured at points 228, 230 of the echo canceller circuit. The measured ERL is compared to the DA minimum ERL value at step 308. If the DA minimum ERL has been reached, the process stops at step 314. If the DA minimum ERL threshold has not been met, a test is made (step 310) to see if the attenuation values of the attenuation 206, 208 have reached respective minimum attenuation values. If the minimum attenuation values have been reached, the process stops (step 314). Otherwise, the attenuation values are lowered or reduced (step 312) and processing loops back and continues with measurement of the ERL at step 306.

While this invention has been particularly shown and described with references to preferred embodiments thereof, it will be understood by those skilled in the art that various changes in form and details may be made therein without departing from the scope of the invention encompassed by the appended claims.

What is claimed is:

1. Apparatus for controlling attenuation to optimize voice quality in a communications network, the apparatus comprising:
    an echo canceller at a first network node through which a call supported by the first network node and a second network node is established; the echo canceller coupled between a first network interface and a second network interface, and having:
    a receive path for coupling a far-end signal from the first network interface to the second network interface;
    a transmit path for coupling a near-end signal from the second network interface to the first network interface;
    an echo canceller circuit coupled to the receive path and the transmit path for filtering far-end echo from the near-end signal;
    a first attenuator in the receive path and a second attenuator in the transmit path, the first and second attenuators coupled immediately following the echo canceller circuit and before the second network interface; and
    a processor in communication with the echo canceller that is configured to:
    set a minimum dynamic attenuation echo return loss (ERL) threshold above a minimum expected ERL associated with optimal operation of the echo canceller circuit;
    set the first and second attenuators to an initial attenuation value upon establishment of the call; and
    measure ERL based on a first power level at a first point between the echo canceller circuit and the first attenuator and a second power level at a second point between the echo canceller circuit and the second attenuator and if the measured ERL is greater than the minimum dynamic attenuation ERL threshold, reduce the attenuation value of at least one of the first and second attenuators at an incremental rate until either (a) ERL, measured after each attenuation reduction, reaches the minimum dynamic attenuation ERL threshold or (b) both attenuation values reach a minimum attenuation value.

2. The apparatus of claim 1 wherein the processor measures echo return loss at a periodic time interval during a far-end talk state.

3. The apparatus of claim 1 wherein at least one of the network nodes is a gateway in a VoIP network.

4. The apparatus of claim 1 wherein at least one of the network nodes is a digital switch in a TDM network.

5. A method of controlling attenuation to optimize voice quality in a communications network, the method comprising:
   establishing a call between a first network node and a second network node, the first network node having an echo canceller circuit coupled between a first network interface and a second network interface;
   upon establishment of the call, setting an initial attenuation value of a first attenuator in a receive path and a second attenuator in a transmit path, the first and second attenuators coupled immediately following the echo canceller circuit and before the second network interface; and
   measuring echo return loss (ERL) based on a first power level at a first point between the echo canceller circuit and the first attenuator and a second power level at a second point between the echo canceller circuit and the second attenuator and if the measured ERL is greater than a minimum dynamic attenuation ERL threshold that is set above a minimum expected ERL associated with optimal operation of the echo canceller circuit, reducing the attenuation value of at least one of the first and second attenuators at an incremental rate until either (a) ERL, measured after each attenuation reduction, reaches the minimum dynamic attenuation ERL threshold or (b) both attenuation values reaches a minimum attenuation value.

6. The method of claim 5 wherein measuring echo return loss includes measuring at a periodic time interval during a far-end talk state.

7. The method of claim 5 wherein at least one of the network nodes is a gateway in a VoIP network.

8. The method of claim 5 wherein at least one of the network nodes is a digital switch in a TDM network.

9. A computer program product having a computer readable medium including computer program logic recorded thereon that, when executed on a computer processor, causes the processor to:
   upon establishment of a call between a first network node and a second network node, the first network node having an echo canceller circuit coupled between a first network interface and a second network interface, set an initial attenuation value of a first attenuator in a receive path and a second attenuator in a transmit path, the first and second attenuators coupled immediately following the echo canceller circuit and before the second network interface; and
   measure echo return loss (ERL) based on a first power level at a first point between the echo canceller circuit and the first attenuator and a second power level at a second point between the echo canceller circuit and the second attenuator and if the measured ERL is greater than a minimum dynamic attenuation ERL threshold that is set above a minimum expected ERL associated with optimal operation of the echo canceller circuit, reduce the attenuation value of at least one of the first and second attenuators at an incremental rate until either (a) ERL, measured after each attenuation reduction, reaches the minimum dynamic attenuation ERL threshold or (b) both attenuation values reaches a minimum attenuation value.

10. The computer program product of claim 9 wherein the logic that causes the processor to measure echo return loss causes the measuring at a periodic time interval during a far-end talk state.

11. Apparatus for controlling attenuation to optimize voice quality in a communications network, the apparatus comprising:
    means for establishing a call between a first network node and a second network node, the first network node having an echo canceller circuit coupled between a packet network interface and a switched network interface;
    means for setting an initial attenuation value of a first attenuator in a receive path coupled immediately following the echo canceller circuit and before the switched network interface and for setting an initial attenuation value of a second attenuator in a transmit path coupled immediately following the echo canceller circuit and before the switched network interface; and
    means for measuring echo return loss (ERL) based on a first power level at a first point between the echo canceller circuit and the first attenuator and a second power level at a second point between the echo canceller and the second attenuator and if the measured ERL is greater than a minimum dynamic attenuation ERL threshold that is set above a minimum expected ERL associated with optimal operation of the echo canceller circuit, reducing the attenuation values of the first and second attenuators at an incremental rate until either (a) ERL, measured after each reduction of the attenuation values, reaches the minimum dynamic attenuation ERL threshold or (b) the attenuation values reach respective minimum attenuation values.

\* \* \* \* \*